July 28, 1931.     E. GRASSOT     1,816,675
SELECTIVE RELAY RESPONSIVE TO UNBALANCED ELECTRIC QUANTITIES
Filed Aug. 13, 1926     6 Sheets-Sheet 1
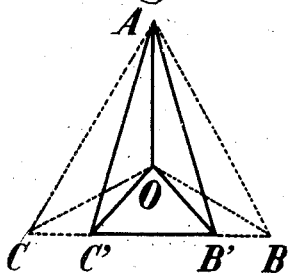
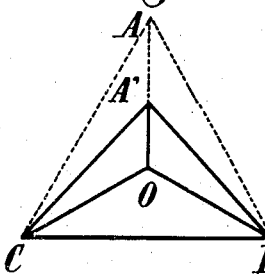
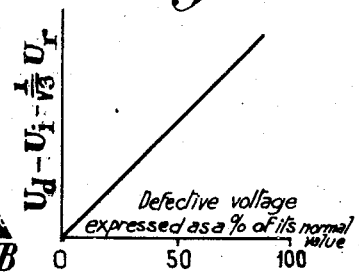
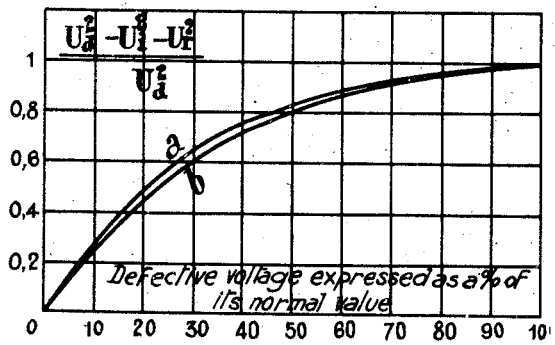
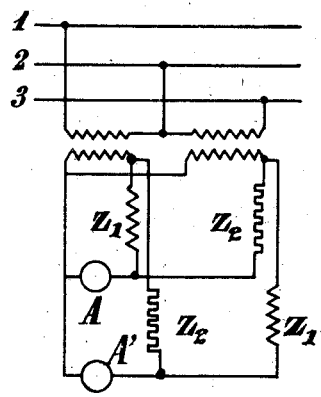
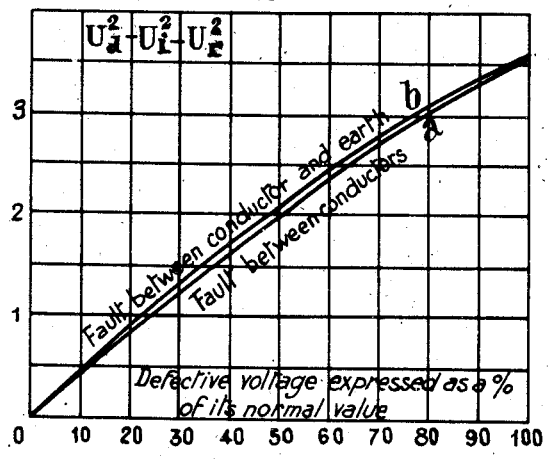
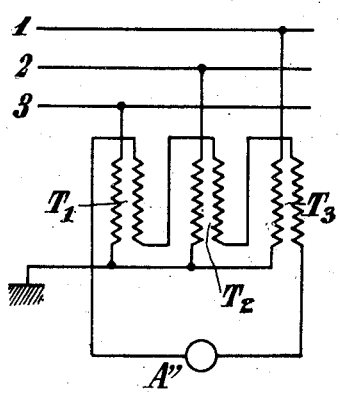
Inventor
Emile Grassot
by Wilkinson & Giusta
Attorneys.

Inventor:
Emile Grassot,
by Charles V. Mullen
His Attorney.

July 28, 1931. E. GRASSOT 1,816,675
SELECTIVE RELAY RESPONSIVE TO UNBALANCED ELECTRIC QUANTITIES
Filed Aug. 13, 1926 6 Sheets-Sheet 3

Inventor
Emile Grassot
by Wilkinson & Giusta
Attorneys.

July 28, 1931. E. GRASSOT 1,816,675
SELECTIVE RELAY RESPONSIVE TO UNBALANCED ELECTRIC QUANTITIES
Filed Aug. 13, 1926 6 Sheets-Sheet 4

Inventor
Emile Grassot
by Wilkinson & Giusta
Attorneys.

July 28, 1931.  E. GRASSOT  1,816,675
SELECTIVE RELAY RESPONSIVE TO UNBALANCED ELECTRIC QUANTITIES
Filed Aug. 13, 1926  6 Sheets-Sheet 5
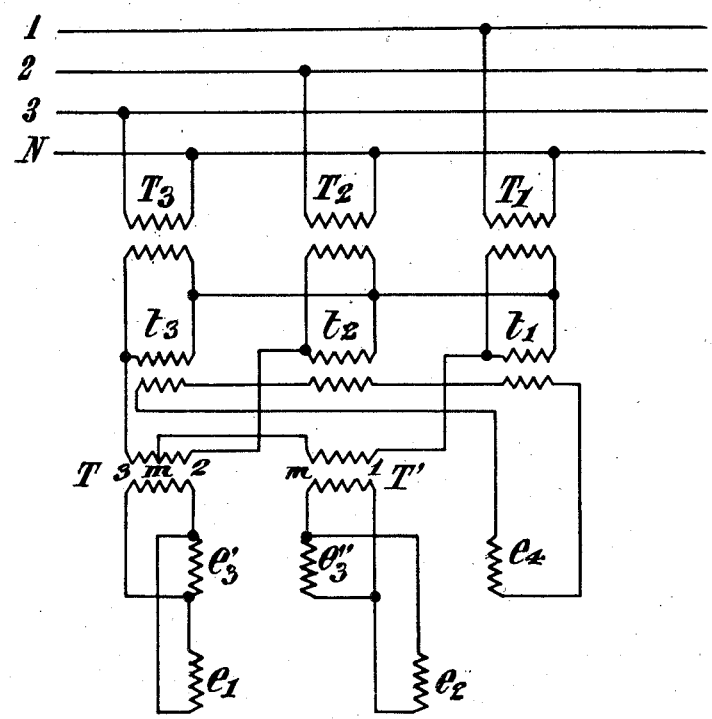
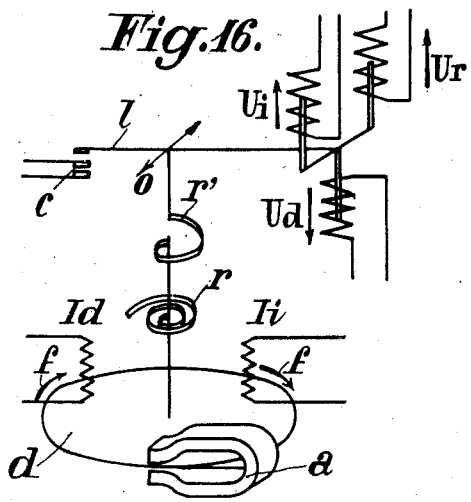
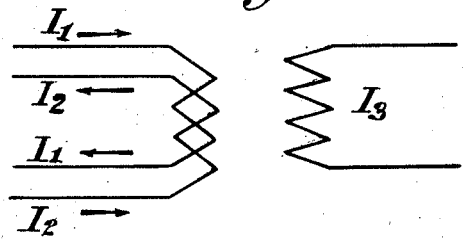
Inventor
Emile Grassot
by Wilkinson & Giusta
Attorneys.

July 28, 1931. E. GRASSOT 1,816,675
SELECTIVE RELAY RESPONSIVE TO UNBALANCED ELECTRIC QUANTITIES
Filed Aug. 13, 1926  6 Sheets-Sheet 6
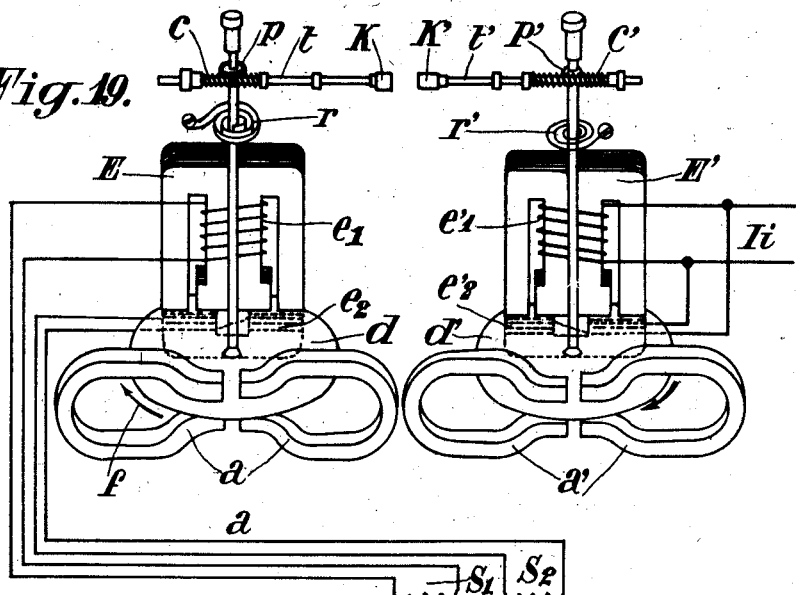
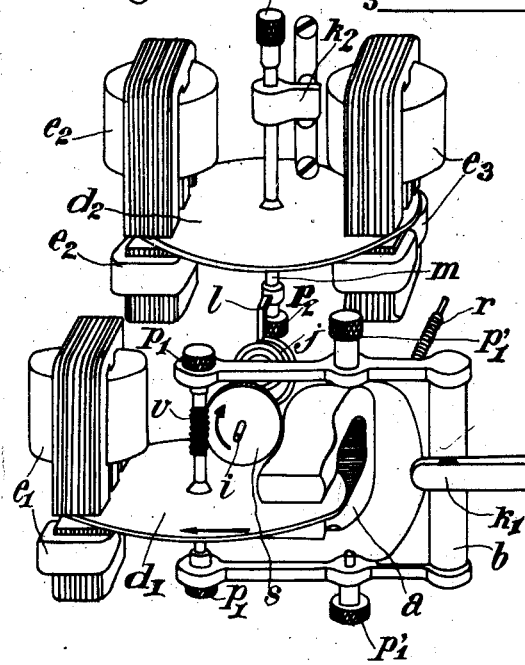
Inventor
Emile Grassot
by Wilkinson & Giusta
Attorneys.

Patented July 28, 1931

1,816,675

UNITED STATES PATENT OFFICE

EMILE GRASSOT, OF MEUDON, FRANCE, ASSIGNOR, BY MESNE ASSIGNMENTS, TO GENERAL ELECTRIC COMPANY, A CORPORATION OF NEW YORK

SELECTIVE RELAY RESPONSIVE TO UNBALANCED ELECTRIC QUANTITIES

Application filed August 13, 1926, Serial No. 129,031, and in France September 19, 1925.

Among the relays at present known, those called impedance-relays, distance-relays or relays for voltage drop, only cause a single voltage and a single current to intervene per unit of the relay. The consequence is that in order to obtain satisfactory protection of three-phase lines it is necessary to use three relay units influenced by the three compound or delta voltages in the case of a three-wire system, and six elements influenced by the three simple or star voltages and the three compound voltages in the case of a four-wire system or with a neutral to earth. This results in complicated and costly apparatus.

Another drawback of these impedance, distance and voltage drop relays lies in the fact that, in the form of monophase units in which they have been designed up to the present, it is necessary to use complex current and voltage laws in order to have a suitable selectivity in the neighbourhood of the fault. These complex laws are obtained only by artifices such as: magnetic saturation, variation in the resistance of a hot wire, variation in apparent resistance in a circuit comprising capacity and self-induction varying as a function of the magnetizing ampere-turns. It ensues that these apparatus are delicate to adjust and that it is difficult to succeed in rendering the characteristics of all the apparatus on one line identical.

The aim of the present invention is to provide a simple relay for three-phase or generally polyphase lines comprising only one unit, acted on by all the line voltages and influenced by any perturbation of the voltage system which is brought about either by a voltage drop between phases, or by a voltage drop between a phase and earth.

The retardation in relay release is a growing function of the perturbed voltage and almost vanishes if this voltage vanishes.

The operation of the relay can also depend on the currents or on their phase sequence components or again on the active, reactive or complex power or on its phase sequence components.

$U_d$ being the positive phase sequence component of the three-phase voltage system, $U_i$ the negative phase sequence component and $U_r$ the zero phase sequence component or geometrical sum of the simple voltages, the retardation in relay release will, in particular, be practically proportional to one of the following functions:

$$U_d^2 - U_i^2 - U_r^2; \quad U_d - U_i - \frac{U_r}{\sqrt{3}},$$

and in general, to $U_d^m - U_i^m - k_r^m$, ($m$ and $k$ being appropriate positive constants), $k^2 - U_i^2 - U_r^2$, $k'^2 - U_i^2$, $k''^2 - U_r^2$, $k$, $k'$ and $k''$ being constants.

The operation of the relay can depend, further, on functions of the form $U_d^2 + U_i^2$, $I_d^2 + I_i^2$, $I_d + I_i +$, $$\frac{I_r}{\sqrt{3}},$$

$I_d^p + I_i^p + A I_r^p$, $p$ and $A$ being constants, $I_d$, $I_i$, $I_r$ the positive, negative and zero phase sequence components of the current.

Certain of the above predetermined functions of the phase sequence components of the system of voltages have been chosen owing to their particularly interesting form from the point of view of selectivity.

My invention will be better understood from the following description when considered in connection with the accompanying drawings and its scope will be pointed out in the appended claims.

In the accompanying drawings:—

Fig. 1ª shows changes in voltage due to a short circuit between conductors.

Fig. 1ᵇ shows the changes in voltage due to a short circuit between conductor and earth.

Figs. 1ᶜ, 1ᵈ, 1ᵉ, 1ᶠ, 1ᵍ, 1ʰ are vector diagrams of the phase sequence operators as applied to the various systems described.

Figs. 2, 3, 4 and 5 are curves giving the relations between functions of voltage components and the defective voltage expressed as a percentage of its normal value.

Figs. 6 and 7 show circuit arrangements for obtaining components of voltages and currents.

Figs. 13 and 14 are circuit arrangements for obtaining components of voltages and currents.

Figs. 15 and 16 are further embodiments of the invention.

Fig. 17 shows a circuit arrangement used with the apparatus of Fig. 16.

Fig. 18 shows a circuit protecting relay similar to that of Fig. 15 embodying certain constructional differences.

Figs. 19 and 20 show further examples of circuit protecting relays according to the invention.

Figure 1C:
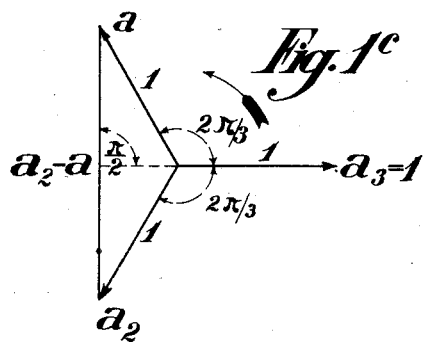
Figure 1D:
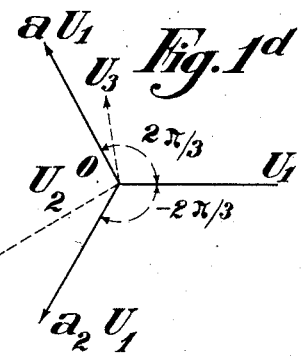

The diagrams of Fig. 1 show the changes in the different voltages in the case of a short-circuit between conductors (Fig. 1ᵃ) and in the case of a short circuit between conductor and earth (Fig. 1ᵇ).

For purposes of simplicity, it will be supposed that the voltage drops occur solely in the line which is fed at constant voltage at its extremities. In the case of a short circuit between conductors, the neutral point 0 remains at the centre of gravity of the compound voltage triangle. The simple voltages therefore have a zero geometrical sum and invariably $U_r = 0$. If one of the compound voltages become zero then $U_d = U_1$. In the case of a short-circuit between conductor and earth the neutral point 0 remains fixed in position, and one of the apices A of the triangle moves along the segment A0. The point 0 is no longer the center of gravity of the triangle A′ B C and the three simple voltages have a resultant. If one of the simple voltages vanish then $$U_i = \frac{1}{2} U_d$$

and $$U_r = \frac{1}{3} U_d.$$

In either case, the defective voltage will be taken as independent variable, reckoned as a percentage of its normal value. In the event of a short-circuit between the phases B and C, the variable will then be $$100 \times \frac{B'C'}{BC}$$

and in the event of a short-circuit between phase A and earth, it will be $$100 \times \frac{OA'}{OA}.$$

It is known that a system of three unbalanced vectors $U_1, U_2, U_3$, can be replaced by three systems of balanced vectors $(U_{1d}, U_{2d}, U_{3d})$ of modulus $U_d$; $(U_{1i}, U_{2i}, U_{3i})$ of modulus $U_i$ and $(U_{1a}, U_{2a}, U_{3a})$ of modulus $U_a$ and that the following relations hold:

$$(1a) \quad U_{1d} = \frac{1}{3}(U_1 + aU_2 + a^2U_3)$$

$$(a) \quad (2a) \quad U_{2d} = \frac{1}{3}(U_2 + aU_3 + a^2U_1)$$

$$(3a) \quad U_{3d} = \frac{1}{3}(U_3 + aU_1 + a^2U_2)$$

$$(1b) \quad U_{1i} = \frac{1}{3}(U_1 + a^2U_2 + aU_3)$$

$$(b) \quad (2b) \quad U_{2i} = \frac{1}{3}(U_2 + a^2U_3 + aU_1)$$

$$(3b) \quad U_{3i} = \frac{1}{3}(U_3 + a^2U_1 + aU_2)$$

and $$(c) \quad U_{1a} = U_{2a} = U_{3a} = \frac{1}{3}(U_1 + U_2 + U_3)$$

Where $a$ is a vector of modulus 1 and argument $$\frac{2}{3}\pi$$

(see Fig. 1ᶜ). Consequently $a^2$ is a vector of modulus 1 and argument $$\frac{4}{3}\pi \text{ or } -\frac{2}{3}\pi \text{ and } a^3 = 1.$$

In other words $a$ is a complex operator defined by the relation $$a = \cos\frac{2}{3}\pi + j\sin\frac{2}{3}\pi \text{ where } j = \sqrt{-1}.$$

Consequently the product $(aU_1)$ represents a vector of modulus $U_1$ ($U_1$, $U_2$ and $U_3$ are used to denote both the vectors and their moduli) making an angle of $$\frac{2}{3}\pi$$

with the vector $U_1$, (see Fig. 1ᵈ); the vector $(a^2 U_1)$ is of modulus $U_1$ and is $$-\frac{2}{3}\pi$$

out of phase with respect to $U_1$.

The significance of the products $(aU_2)$, $(a^2U_2)$, or $(aU_3)$, $(a^2U_3)$ can be deduced from similar considerations. Fig. 1ᵈ illustrates the system of vectors $(U_1, U_2, U_3)$ and the vectors $(aU_1)$ and $(a^2U_1)$.

If $U_1, U_2, U_3$ represent the voltages of a balanced three-phase system $U_1 + U_2 + U_3 = 0$, the form of the equation given under $(a)$ and $(b)$ can be modified to afford a simple, graphical construction.

Thus in (1a) writing $-(U_1+U_3)$ instead of $U_2$ then $U_{1d} = \frac{1}{3}[U_1 + a^2 U_3 - a(U_1+U_3)]$ $= \frac{1}{3}\{(a^2-a)U_3 - U_1(a-1)\}$ $= \frac{1}{3}\{(a^2-a)U_3 - a^3 U_1(a-1)\}$ since $a^3=1$ $= \frac{1}{3}(a^2-a)[U_3 - a^2 U_1]$ Similar expressions can be deduced for $U_{2d}$ and $U_{3d}$.

From Fig. 1c it will be seen that $(a^2-a)$ represents a vector of modulus $$2 \sin \frac{\pi}{3} = \sqrt{3} \text{ and argument } -\frac{\pi}{2}.$$

Figure 1E:
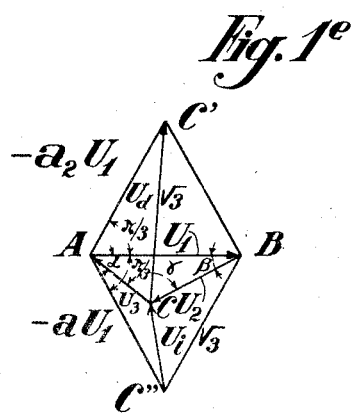
Figure 1F:
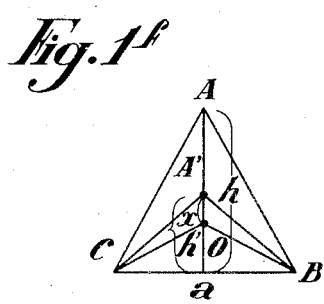
Figure 1G:
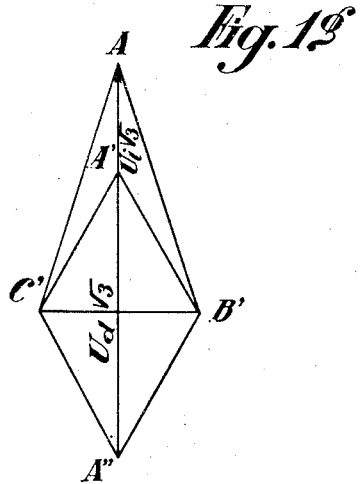
Figure 1H:
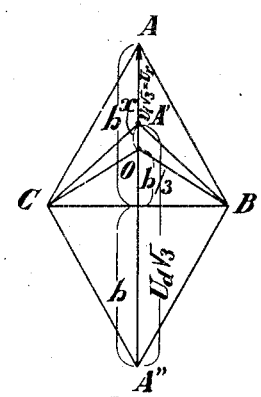

Turning now to Fig. 1e, let A B C be the triangle formed by the three vectors $U_1, U_2, U_3$; A B C′ and A B C″ two equilateral triangles constructed on A B. Then $\overline{A C'}$ will represent $-a^2 U_1$ and $\overline{C C'}$ will represent $(U_3 - a^2 U_1)$. From the expression for $U_d$ deduced above, it follows that $(U_3 - a^2 U_1)$ is a vector of modulus $$\frac{3 U_d}{(a^2-a)} = \frac{3 U_d}{\sqrt{3}} \; \& \; \frac{3 U_d}{\sqrt{3}} = \sqrt{3} U_d \text{ i.e. } \overline{CC'}$$

is a vector of modulus $$\sqrt{3} U_d.$$

By substituting $-(U_1+U_3)$ for $U_2$ in Equation (1b) we obtain similarly $U_i = \frac{1}{3}(a-a^2)(U_3 - aU_1)$ i.e. $(U_3 - aU_1)$ is a vector of modulus $$\sqrt{3} \; U_i.$$

Now $(U_3 - aU_1)$ is represented by $\overline{CC''}$ consequently $$\overline{CC''} = \sqrt{3} U_i.$$

The following relations between the scalar quantities may be written down:

$\overline{CC'}^2 = \overline{AC}^2 + \overline{AC'}^2 - 2 \cdot \overline{AC} \cdot \overline{AC'} \cos\left(\alpha + \frac{\pi}{3}\right)$ where $\alpha = C_A B$ $\overline{CC''}^2 = \overline{AC}^2 + \overline{AC''}^2 - 2 \cdot \overline{AC} \cdot \overline{AC''} \cos\left(\frac{\pi}{3} - \alpha\right)$ i.e. $3 U_d^2 = U_3^2 + U_1^2 - 2 U_3 U_1 \cos\left(\alpha + \frac{\pi}{3}\right)$ (3)

$3 U_i^2 = U_3^2 + U_1^2 - 2 U_3 U_1 \cos\left(\frac{\pi}{3} - \alpha\right)$ (4)

By subtraction $U_d^2 - U_i^2 = \frac{4}{3} U_3 U_1 \sin \alpha \sin \frac{\pi}{3}$ $= \frac{2}{\sqrt{3}} U_3 U_1 \sin \alpha$ (5)

now $U_3 U_1 \sin \alpha = 2S$ where S is area of △ A B C $$\therefore U_d^2 - U_i^2 = \frac{4}{\sqrt{3}} S$$

also by addition $$U_d^2 + U_i^2 = \frac{2}{3}(U_3^2 + U_1^2 - U_3 U_1 \cos \alpha)$$

and by symmetry the following expressions hold:

$$U_d^2 + U_i^2 = \frac{2}{3}(U_1^2 + U_2^2 - U_1 U_2 \cos \beta)$$

where $\beta = A_B C$ of △ A B C $$U_d^2 + U_i^2 = \frac{2}{3}(U_2^2 + U_3^2 - U_2 U_3 \cos \gamma)$$

where $\gamma = B_C A$ of △ A B C

By adding up these three expressions for $U_d^2 + U_i^2$ we obtain $U_d^2 + U_i^2 = \frac{4}{9}(U_1^2 + U_2^2 + U_3^2) -$ $\frac{2}{9}(U_3 U_1 \cos \alpha + U_1 U_2 \cos \beta + U_2 U_3 \cos \gamma)$ Now it follows from the properties of the △ A B C that $2(U_3 U_1 \cos \alpha + U_1 U_2 \cos \beta + U_2 U_3 \cos \gamma) = U_1^2 + U_2^2 + U_3^2$ Consequently $$U_d^2 + U_i^2 = (U_1^2 + U_2^2 + U_3^2)\left(\frac{4}{9} - \frac{1}{9}\right) =$$

$$\frac{1}{3}(U_1^2 + U_2^2 + U_3^2) \quad (6)$$

Expression $U_d^2 - U_i^2 - U_r^2$ as a function of the defective voltage denoted by X.
In what follows $U_r = 3 U_a = U_1 + U_2 + U_3$

*Case of Fig. 1a.*—In the case of a short circuit between conductors as illustrated in Fig. 1a, $U_r = 0$ and as has already been shown $$U_d^2 - U_i^2 = \frac{4}{\sqrt{3}} S.$$

Now $$S = \frac{hx}{2}$$

where $h$ is the constant height of the △ A B′ C′ (Fig. 1a) and $x$ is the defective voltage, in this case B′ C′. Consequently $$U_d^2 - U_i^2 - U_r^2 = \frac{2}{\sqrt{3}} hx.$$

This expression is proportional to $x$ and vanishes when $x$ becomes zero.

*Case of Fig. 1b.*—In the case of a short circuit between a conductor and earth as illustrated in Fig. 1$^b$.

$$x = OA' \text{ and } S = \tfrac{1}{2} BC \cdot aA' \quad (\text{Fig. 1}^f).$$

Now $$BC = \frac{2}{\sqrt{3}} h$$

where $h$ is the height of the equilateral triangle A B C.

also $$aA' = ao + x = \frac{h}{3} + x$$

$$\therefore U_d^2 - U_i^2 = \frac{2}{\sqrt{3}} \cdot \frac{2}{\sqrt{3}} \cdot h \cdot \left(\frac{h}{3} + x\right)$$

$$\therefore U_d^2 - U_i^2 = \frac{4}{9} h (h + 3x) \quad (7)$$

also $$U_r = \overline{A'A} = \frac{2h}{3} - x \quad (8)$$

$$U_d^2 - U_i^2 - U_r^2 = x \left(\frac{8h}{3} - x\right) \quad (9)$$

This is the equation of a parabola as illustrated in Fig. 2. $x$ can only vary between 0 (absolute short-circuit between earth and a phase wire occurring at the spot where the relay is located) and $$\frac{2h}{3}$$

(case of balanced voltages).
Form assumed by $$\left(U_d - U_i - \frac{U_r}{\sqrt{3}}\right).$$

*Case of Fig. 1$^a$.*—For a short circuit between conductors as illustrated in Fig. 1$^a$, Fig. 1$^g$ shows the vector diagram of Fig. 1$^e$ suitably modified to meet the case, the two equilateral triangles A″B′C′ and A′B′C′ being constructed on the base B′C′ which represents the defective voltage. Then $\overline{AA''}$ of Fig. 1$^e$ corresponds to $\overline{CC'}$ of Fig. 1$^a$.

$$\therefore \overline{AA''} = U_d \sqrt{3}$$

Also $\overline{AA'}$ of Fig. 1$^e$ corresponds to $\overline{CC''}$ of Fig. 1$^a$.

$$\therefore \overline{AA'} = U_i \sqrt{3}$$

$$\therefore U_d - U_i = \frac{\overline{AA''} - \overline{AA'}}{\sqrt{3}} = \frac{\overline{A'A''}}{\sqrt{3}}$$

$$= B'C'$$

$$= x$$

Now $U_r = 0$ since in Fig. 1$^a$ $U_1 + U_2 + U_3 = 0$ $$\therefore U_d - U_i - \frac{U_r}{\sqrt{3}} = x$$

Hence the expression is proportional to $x$ and vanishes when $x$ becomes zero.

*Case of Fig. 1$^b$.*—For a short-circuit between one of the conductors and earth, the Fig. 1$^h$ shows the modified form which the vector diagram of Fig. 1$^e$ assumes. The defective voltage $x$ is now represented by $\overline{OA'}$. In this case the zero phase sequence component $U_r$ does not vanish but is represented by $\overline{AA'}$.

But as previously $$\overline{AA'} = U_i \sqrt{3}.$$

In Fig. 1$^e$, A B C is the voltage triangle and the two equilateral triangles A B C and A″ B C are constructed on the base B C Consequently $$\overline{A'A''} = U_d \sqrt{3}$$

$$\overline{AA'} = U_i \sqrt{3} = U_r$$

$$\therefore U_d - U_i - \frac{U_r}{\sqrt{3}} = \frac{\overline{A'A''}}{\sqrt{3}} - \frac{\overline{AA'}}{\sqrt{3}} - \frac{\overline{AA'}}{\sqrt{3}}$$

$$\therefore U_d - U_i - \frac{U_r}{\sqrt{3}} = \frac{\overline{A'A''} - 2\overline{AA'}}{\sqrt{3}}$$

$$U_d - U_i - \frac{U_r}{\sqrt{3}} = \frac{1}{\sqrt{3}} \left\{ \frac{4h}{3} + x - 2\left(\frac{2h}{3} - x\right) \right\}$$

$$\therefore U_d - U_i - \frac{U_r}{\sqrt{3}} = x \sqrt{3}$$

In this case likewise the expression is proportional to $x$ and vanishes when $x$ becomes zero. Consequently both in the case of a short-circuit between conductors and in the case of a short-circuit between a conductor and earth, the expression $$U_d - U_i - \frac{U_r}{\sqrt{3}}$$

when plotted against the defective voltage expressed in a percentage of its normal value, gives a straight line as is shown in Fig. 5.

The curves Figs. 2, 3, 4 and 5 indicate the variations of the functions $$U_d^2 - U_i^2 - U_r^2, \frac{U_d^2 - U_i^2 - U_r^2}{U_d^2}, \frac{U_d^2 - U_i^2 - U_r^2}{U_d^2 + U_i^2}$$

and $$U_d - U_i - \frac{U_r}{\sqrt{3}}.$$

In the first three figures, the $a$ curves refer to the short-circuits between conductors and the $b$ curves to the short-circuits between conductor and earth. The abscissæ for the $a$ curves must be taken to represent the defective compound voltage, such as $$100 \, x \, \frac{B'C'}{BC}$$

and for the $b$ curves the defective simple voltage, such as $$100 \, x \, \frac{OA'}{OA}.$$

Figure 4:
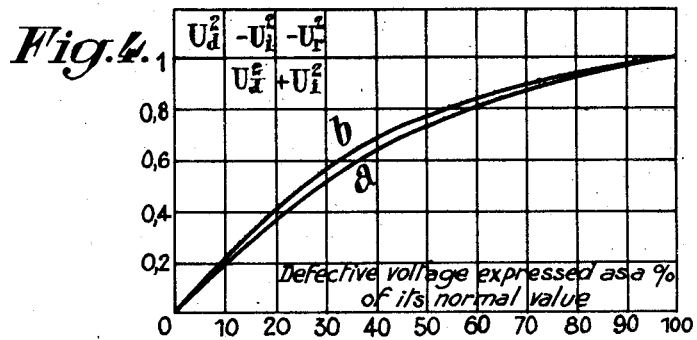

It will be seen that the curves of Figs. 2 and 5 are practically rectilinear and that the curves of Figs. 3 and 4 are markedly concave, such concavity being turned towards the abscissa axis.

The release retardations, which are proportional to the ordinates increase in the first case in proportion to the lengths of line included between the fault and the relay, and in the second and third cases they increase proportionately less as the length of line is longer. Hence, these two latter curves enable the selectivity of the relays to be considerably improved in the vicinity of the fault. The choice between these different characteristics will evidently depend on the line constants.

In order to obtain the components $U_d$ and $U_i$ circuit arrangements can be utilized similar to that of Fig. 6 in which $Z_1$ and $Z_2$ are impedances equal in absolute value, but such that $Z_1$ produces a phase displacement 60° greater than that produced by $Z_2$; A and A' the circuits or apparatus through which flow currents respectively proportional to the negative phase sequence component $U_i$ and the positive phase sequence component $U_d$ of the voltage system.

In order to obtain a current proportional to the zero phase sequence component of the voltage $U_r$ a circuit arrangement similar to that of Fig. 7 can be utilized, in which $T_1$, $T_2$, $T_3$ are three identical transformers and A'' the circuit or apparatus through which a current proportional to $U_r$ flows.

Figures 8, 9:
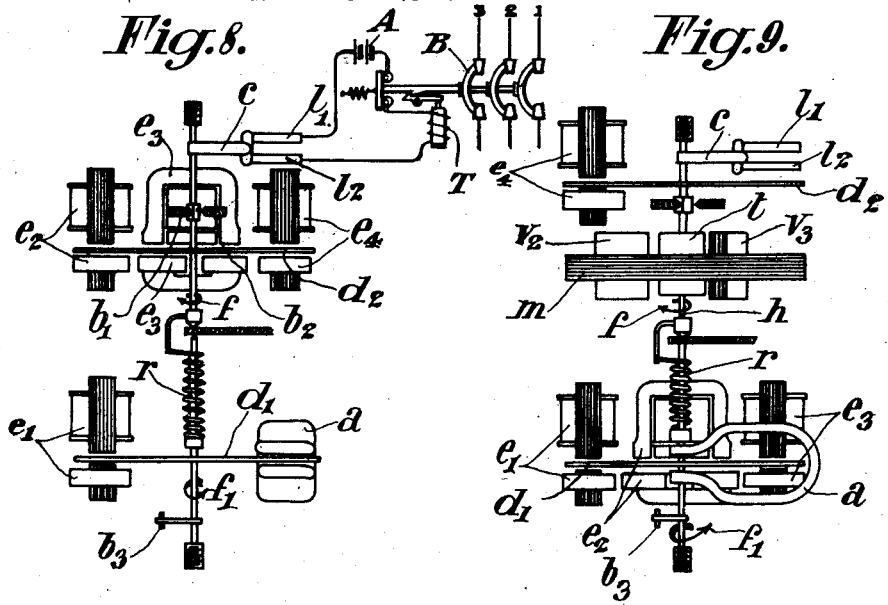
Figs 8 and 9 show embodiments of circuit protecting relays.

Fig. 8 shows an embodiment of the relay, in which the components $U_d$, $U_i$ and $U_r$ are utilized, said components being produced outside the apparatus by devices shown in Figs. 6 and 7.

An electro-magnet $e_1$ through which flows a current proportional to $U_d$ is made to act on a metallic disc $d_1$ (Fig. 8) braked by a magnet $a$. This disc therefore rotates at a speed proportional to $U_d^2$ and in the direction of the arrow $f_1$. A yielding means such as a helical spring $r$ is fixed at one end on the spindle of the disc $d_1$ and at the other end on a socket integral with the spindle of another disc $d_2$ coaxial with the first. The disc $d_2$ can have a slight displacement, limited by two stops $b_1$ and $b_2$. Three electro-magnets $e_2$, $e_3$ and $e_4$ act on this disc. A current proportional to $U_d$ flows through the electromagnet $e_2$ which exerts force in the direction of the arrow $f$. The electro-magnets $e_3$ and $e_4$ have currents proportional to $U_i$ and $U_r$ flowing through them respectively and exert a force in the opposite direction to $f$. Hence the total torque acting on the disc $d_2$ is of value $U_d^2 - U_i^2 - U_r^2$. A contact member $c$ mounted on the spindle of the disc $d_2$ can connect together two metallic strips $l_1$ and $l_2$. When the metallic strips are connected together by the contact member $c$, they close a circuit containing a trip-coil T energized by an auxiliary source of current supplied by the battery A for example. The trip-coil T is adapted to actuate an oil or other type of circuit breaker B which is mounted in the main circuit 1, 2, 3. This form of protective device is of course likewise applicable to the other relays about to be described. The operation of the relay is as follows: $U_d^2$ being always greater than or at least equal to $U_i^2 + U_r^2$, the resultant torque on the disc $d_2$ has always the same sign, and is always in the direction $f$. This torque tends to separate the contact $c$ from the strips $l_1$ and $l_2$ and to press the movable equipment against the stop $b_1$. If a fault occurs at instant 0 (zero), the disc $d_1$ immediately starts to rotate. An auxiliary device only permits this motion when the fault occurs, and brings the disc back if the fault ceases. When the disc $d_1$ starts rotating the spring $r$ tends to rotate the disc $d_2$ towards the contact. This rotation is brought about when the spring torque overcomes the total torque of the electromagnets, $e_2$, $e_3$, $e_4$ which is exerted in the opposite direction. Consequently the disc $d_2$ is subjected to two counteracting torques, namely the torque $U_d^2 - U_i^2 - U_r^2$ produced by the electromagnets $e_2$, $e_3$, $e_4$ and a torque $K\alpha$ transmitted by the spring $r$, proportional to the angle of twist $\alpha$ of the spring. For equilibrium $$U_d^2 - U_i^2 - U_r^2 = K\alpha$$

K being a constant. In addition to the torque $U_d^2$ exerted on the disc $d_1$, by the electromagnet $e$, said disc is subjected to a torque $K'\Omega$ proportional to the angular velocity $\Omega$ of the disc and which is provided by the magnet $a$. Finally, the disc $d_1$, is subjected to the torque $K\alpha$ of the spring $r$.

Assuming that the angular velocity is uniform, then for equilibrium $$U_d^2 = K\alpha + K'\Omega$$

$$\therefore K'\Omega = U_d^2 - K\alpha$$

$$= U_d^2 - (U_d^2 - U_i^2 - U_r^2) \text{ since}$$

$$K\alpha = U_d^2 - U_i^2 - U_r^2$$

Now $$\alpha = \Omega t \therefore U_d^2 - U_i^2 - U_r^2 = K\Omega t$$

$$\therefore U_d^2 - U_i^2 - U_r^2 = \frac{Kt}{K'}\{U_d^2 - (U_d^2 - U_i^2 - U_r^2)\}$$

$$\therefore t = \frac{K'}{K} \frac{U_d^2 - U_i^2 - U_r^2}{U_d^2 - (U_d^2 - U_i^2 - U_r^2)}$$

Assuming $(U_d^2 - U_i^2 - U_r^2)$ is negligible in comparison with $U_d^2$ $$t = \frac{K'}{K} \cdot \frac{U_d^2 - U_i^2 - U_r^2}{U_d^2}$$

i. e. the relay release retardation is proportional to $$\frac{U_d^2 - U_i^2 - U_r^2}{U_d^2}$$

The resolution of the voltage system into its symmetrical elements can be avoided. In particular, torques proportional to $U_d^2 + U_i^2$ and $U_d^2 - U_i^2$ can be obtained in the relay. Fig. 9 shows a device based on this consideration.

In the relay shown in Fig. 9 the motor system is constituted by a metallic disc $d_1$ on which three electro-magnets $e_1, e_2, e_3$ act and through which three currents proportional to the three delta or compound voltages flow respectively and the total torque exerted on the disc is given by $$c_1 = k_1(U_d^2 + U_i^2).$$

Braked by a magnet $a$, the disc rotates in the direction $f_1$ at a speed proportional to $U_d^2 + U_i^2$.

The opposing equipment comprises a three-phase asynchronous motor, on which the three compound voltages act and an electro-magnet on which the zero phase sequence component of the voltage acts. This asynchronous motor can, in particular, consist of three windings $v_1, v_2, v_3$ (Fig. 10) located on three polar members of a single magnetic circuit surrounding a bell or metallic drum $t$ in regular spaced relation thereto.

The torque of this asynchronous motor will be given by:

$$c_2 = k_2(U_d^2 - U_i^2).$$

The bell $t$ is keyed on a spindle $h$ (Fig. 9). A disc $d_2$ acted on by an electro-magnet $e_4$ through which flows a current proportional to the zero phase sequence component of the voltage is keyed on the same spindle. The torque exerted on the bell is in the direction $f$ and the torque exerted on the disc $d_2$ is in the opposite direction. The total torque on the spindle $h$ is therefore of value.

$$c'_2 = k_2(U_d^2 - U_i^2 - U_r^2).$$

The disc $d_1$ is braked by a magnet $a$ and is connected to the spindle $h$ through a spring $r$, as in the apparatus described above. The operation is the same and the relay release retardation is proportional to $$\frac{U_d^2 - U_i^2 - U_r^2}{U_d^2 + U_i^2}.$$

A stop $b_3$ limits the travel of the disc $d_1$.

Figures 10, 11:
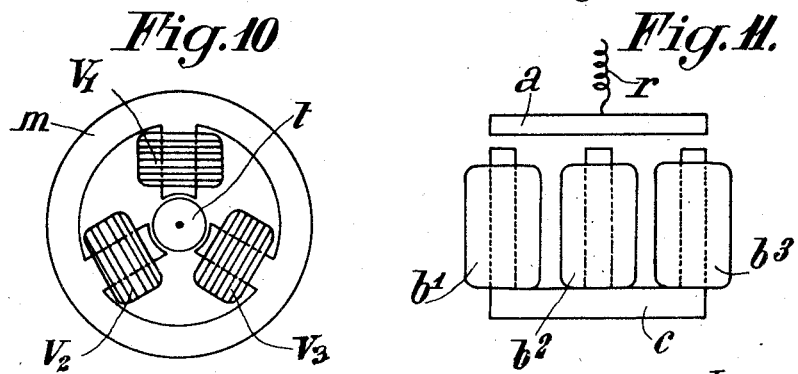
Fig. 10 is a detail view of the asynchronous motor shown in Fig. 9.
Fig. 11 is a diagrammatic view of a relay.
Figure 12:
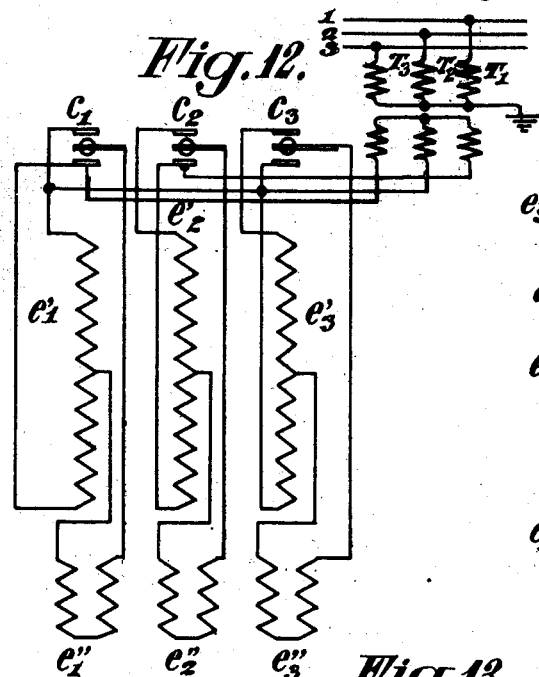
Fig. 12 is a circuit arrangement used in conjunction with the relay of Fig. 11.

In order that the disc $d_1$ shall only be set in motion at the moment when a fault occurs, and in order to bring the disc back when the fault ceases, the following devices shown diagrammatically in Figs. 11 and 12 are made use of. Through three coils $b^1, b^2, b^3$ located on the three cores of a single yoke $c$ flow respectively three currents proportional to the three currents of the line to be protected. A movable armature $a$ controlled by a spring $r$, is attracted if one of the currents exceeds a fixed value. This armature establishes a system of three contacts $c_1, c_2, c_3$ (Fig. 12). The electro-magnets $e_1, e_2, e_3$, which act on the disc $d_1$ include two windings $e'_1, e''_1$ for the electro-magnet $e_1, e'_2, e''_2$ for the electro-magnet $e_2$ and $e'_3, e''_3$ for the electro-magnet $e_3$. The windings $e'_1, e'_2, e'_3$ are connected across the compound voltage, reduced to a suitable value, for example, by transforming means $T_1, T_2, T_3$, as shown, and the windings $e''_1, e''_2, e''_3$ are connected at one of their ends to the middle points of the windings $e'_1, e'_2, e'_3$ and at the other ends to one or other of the outlets of the windings $e'_1, e'_2, e'_3$ according to the position of the contacts $c_1, c_2, c_3$, i. e. of the movable armature $a$. This inversion of the windings $e''_1, e''_2, e''_3$ enables the direction of rotation of the disc $d_1$ to be changed.

The operation of the relay is then as follows: As long as a fault has not occurred in the installation, the line currents have a moderate value; the armature $a$ is not attracted and the contacts $c_1, c_2, c_3$ are in such a position that the disc $d_1$ has a tendency to rotate in the opposite direction to that of the arrow $f_1$. The stop $b_3$ limits its motion. When a fault occurs there is simultaneous drop in voltage and rise in current. The armature $a$ is attracted, the contacts $c_1, c_2, c_3$ assume another position which corresponds to the rotation of the disc $d_1$ in the direction $f_1$. The spring $r$ is then wound up or stressed until its effect overcomes that of the coils $v_1, v_2, v_3$ and the contact $c$ connects the strips $l_1$ and $l_2$.

Figure 13:
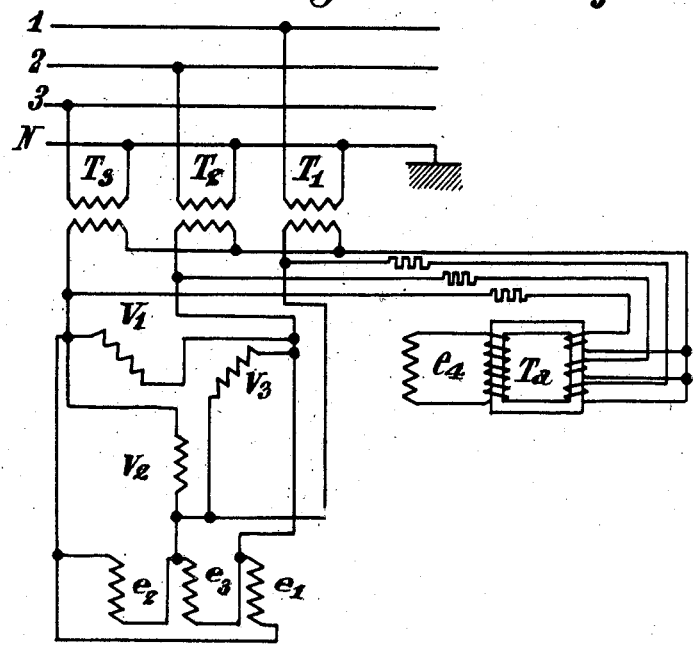

Fig. 13 is an assembly wiring diagram of the connections of a relay according to the invention. $T_1, T_2, T_3$ are three voltage transformers the primaries of which are mounted in star connection between the conductors and earth. $e_1, e_2, e_3$ are the simplified windings of the motor equipment. $v_1, v_2, v_3$ are the windings of the three-phase asynchronous motor. $T_a$ is an auxiliary transformer intended to totalize the simple voltages in order to deliver to the winding $e_4$ a current proportional to the zero phase sequence component of voltage. The windings $e_1, e_2, e_3, v_1, v_2, v_3$ are connected across the differences between the simple voltages taken two at a time in cyclic order. Hence currents proportional to the compound voltages flow through them.

If the disc $d_1$ were replaced by a constant speed motor such as a clockwork motion, an induction motor with practically constant speed or the like, obviously the time of release would be proportional to $U_d^2 - U_1^2 - U_r^2$.

The use of three-phase circuit arrangements permits of important simplifications in the design of relays. Thus in order to obtain a torque proportional to $(U_d^2 + U_1^2)$, $U_d$ being the positive phase sequence component and $U_1$ the negative phase sequence component of the system of voltages, it is sufficient to use two electro-magnets in place of the three electro-magnets of the three-phase system. In order to obtain a torque proportional to $(U_d^2 - U_1^2)$ an electro-magnet with two windings similar to those of induction meters can be used in a two-phase system, currents proportional to the two two-phase voltages flowing through these windings. This device replaces the three-phase asynchronous motor of the opposing equipment of Fig. 9.

Moreover, with the Scott device, with T circuit arrangements, etc. . . . . a three-phase system of voltages or currents can be easily transformed into a two-phase system, the symmetrical components of which are proportional to those of the three-phase system.

It is even possible to obtain directly a symmetrical two-phase system either positive or negative starting from the given three-phase system of voltages or currents.

Fig. 14 is a wiring diagram of a relay similar to that of Fig. 9, the wiring of the relay being partially carried out two-phase and the two-phase voltages being obtained by a Scott circuit arrangement fed by the three-phase voltages of the circuit to be protected.

Figure 15:
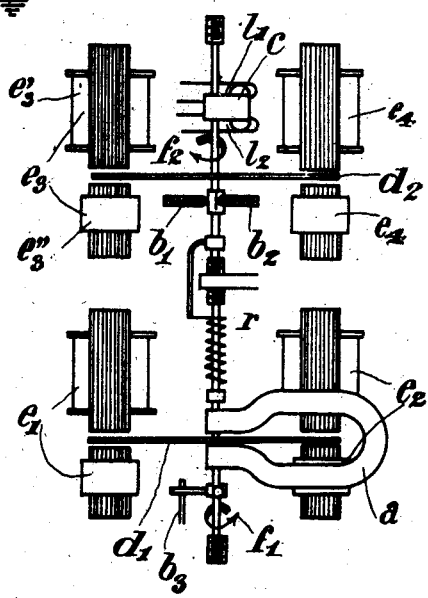

Fig. 15 is a general view of the relay.

In Fig. 14, N, 1, 2, 3, represent the four conductors of the circuit (N can also represent the earth in the case of lines with three conductors and earthed neutral); $T_1$, $T_2$, $T_3$ represent three voltage transformers (which need not exist in low voltage lines); $t_1$, $t_2$, $t_3$ are three voltage transformers the secondaries of which connected in series feed one or several windings of an electro-magnet $e_4$; T, T′ are the transformers of a Scott device, the secondary two-phase voltages of which feed on one side, the two windings $e'_3$, $e''_3$ of an electro-magnet $e_3$ and on another side the windings of two other electro-magnets $e_1$ and $e_2$. These latter produce the torque proportional to $(U_d^2 + U_1^2)$ whilst the electro-magnet $e'_3 e''_3$ produces the torque proportional to $(U_d^2 - U_1^2)$ which may be obtained by the vector product of the delta voltage and the median voltage which is in quadrature thereto under balanced conditions. For this purpose the power factors of the two parts $e'_3$, $e''_3$ of the electro-magnet $e_3$ should be substantially the same. The electro-magnet $e_4$ produces the torque proportional to the square of the zero phase sequence component of the voltage. This latter electro-magnet is unnecessary as also are the transformers which feed it, if the line has three conductors without earthed neutral.

Fig. 15 shows an embodiment of the relay the wiring diagram of which is indicated in Fig. 14. In Fig. 15, $d_1$ denotes a metallic disc on which act two electro-magnets $e_1$ and $e_2$ respectively subjected to the two two-phase voltages $V_{2.3}$ and $V_{m.1}$. This disc can rotate in the direction $f_1$ if a fault occurs and in the opposite direction when the fault has ceased. The change in direction of rotation can take place by means of a device similar to that mentioned above. The disc $d_2$ is retarded by a magnet $a$. A spring $r$ is fixed at one end to the spindle of the disc $d_1$ and at the other end to the spindle of a second disc $d_2$, on which two electro-magnets $e_3$ and $e_4$ act. Through the winding $e'_3$ of the electro-magnet $e_3$ there flows a current proportional to one of the two-phase voltages such as $V_{2.3}$ and through the winding $e''_3$ a current proportional to the other two-phase voltage such as $V_{m.1}$. The torque of this electro-magnet is exerted in the direction $f_2$. Through the electro-magnet $e_4$ flows a current proportional to the zero phase sequence component $U_r$ of the voltage (geometrical sum of the simple voltages) and its torque is exerted in the opposite direction to $f_2$. Two stops $b_1$ and $b_2$ limit the movement of the disc $d_2$. A contact member $c$ can connect two metallic strips $l_1$ and $l_2$, thereby causing the operation of a circuit breaker.

Fig. 16 shows diagrammatically another embodiment of a relay according to my invention.

A metallic disc $d$, braked by a magnet $a$ is subjected to the action of two electro-magnets through which two currents proportional to $I_d$ and $I_1$ flow respectively. The electro-magnet through which the current $I_1$ flows need alone be retained if the possibility of a symmetrical fault is not taken into consideration. The disc is controlled by a spring $r$. A second spring $r'$ connects the disc spindle to the opposing equipment which may be constituted by a lever rotatable about a horizontal axis O.

One of the ends of the lever can, on counter-clockwise rotation, close a controlling contact $c$. The other end is provided with three magnetic cores subjected to the action of three solenoids through which currents proportional to $U_d$, $U_1$ and $U_r$ flow respectively. The coil acted on by $U_d$ exerts a downward attraction and the other two exert an upward attraction. Matters are arranged so that the attractions produced by the three coils are respectively proportional to $U_d$, $U_1$ and $$\frac{U_r}{\sqrt{3}}.$$

The total force in the downward direction is thus proportional to $$\left(U_d - U_i - \frac{U_r}{\sqrt{3}}\right).$$

The contact $c$ closes when the disc $d$ has rotated through a sufficient angle for the spring $r'$ to overcome the attraction of the solenoids.

The voltages $U_d$ and $U_i$ along with the currents $I_d$ and $I_i$ can be obtained by known circuit arrangements.

It is not necessary to obtain exactly the function $$\left(U_d - U_i - \frac{U_r}{\sqrt{3}}\right)$$

because the function $(U_d{}^2 - U_i{}^2 - U_r{}^2)$ which is obtained by natural means gives a curve differing only slightly from a straight line. It will be easy to obtain a function intermediate the two preceding ones.

Likewise, it is not necessary for the torque that acts on the motor equipment to be strictly proportional to $$\left(I_d + I_i + \frac{I_r}{\sqrt{3}}\right)$$

It could be taken proportional to $(I_d{}^2 + I_i{}^2)$ which is easily obtainable by conversion to two-phase. In Fig. 17 is shown a two-phase circuit arrangement for the electro-magnets acting on the lower disc of Fig. 16. Through one of the electro-magnets the current $I_s$ flows and through the two windings of the other the currents $I_1$ and $I_2$ so that their ampere-turns are in opposition. By suitably regulating the number of coil turns, a symmetrical two-phase system of ampere-turns is obtained for a balanced system of currents $I_1$, $I_2$, $I_s$.

In the preceding devices the line current was utilized as one of the characteristic elements of the fault.

Now a relay can be designed which in no way depends on line currents, and which produces selectivity solely by making use of voltage distortion. For this purpose the opposing unit of the relay being similar to those already described, its motor element is subjected to the action of the line voltages or to the action of a function of their symmetrical components such that the force exerted on this equipment is a maximum in the vicinity of the fault.

An electro-magnet which is subjected to the negative phase sequence components $U_i$ of the voltage system can be made to act on the movable relay equipment. An opposing spring will maintain the movable relay equipment against the stop below a certain value of $U_i$. In the neighborhood of the fault, the term $U_i$ will become important and the movable equipment will start rotating. In order to preserve the sensitivity of the relay in the event of a short circuit between conductor and earth there can be added an electro-magnet influenced by the voltage $U_r$.

The spring for bringing back the movable equipment into position may be dispensed with by causing a system of electro-magnets to act on said movable equipment, the electro-magnets are so combined that, if the voltages being balanced, there is a tendency for the movable equipment to rotate in the backwards direction and if the want of balance of the voltages increases beyond a certain value, it has a tendency to rotate in the other direction, that is to say, in that direction which can bring about the release of the circuit-breaker.

As an example, two methods of realizing the present device will be described, one in which the line voltages are used directly, the other in which their symmetrical components obtained by known circuit arrangements are used.

In the first method, the system of three-phase voltages may first be transformed into a two-phase system, for the purpose of simplifying the apparatus.

The relay motor equipment comprises a metallic disc on which three electro-magnets act. One electro-magnet includes two windings through which two currents flow respectively proportional to the two two-phase voltages and produces a torque on the disc:

$$C_1 = K_1 (U_d{}^2 - U_i{}^2)$$

$U_d$ and $U_i$ being the symmetrical positive and negative phase sequence components of the voltage. The two other electro-magnets are influenced, one by one of the two-phase voltages and the other by the other two-phase voltage and the total torque of these two electro-magnets can be written:

$$C_2 = K_2 (U_d{}^2 + U_i{}^2).$$

Matters are arranged so that $C_1$ and $C_2$ are of contrary sign, $C_2$ acting in the direction which produces the relay release, and $C_1$ acting in the opposite direction. It is easy to see that the disc is under the influence of no torque if $$\frac{K_1}{K_2} = \frac{U_d{}^2 + U_i{}^2}{U_d{}^2 - U_i{}^2} = \frac{1+\epsilon^2}{1-\epsilon^2} \text{ where } \epsilon = \frac{U_i}{U_d}$$

The disc is prevented from moving if $$\frac{K_1}{K_2} > \frac{1+\epsilon^2}{1-\epsilon^2}$$

and it turns in the direction of release if $$\frac{K_1}{K_2} < \frac{1+\epsilon^2}{1-\epsilon^2}$$

The opposing relay equipment can be constituted as has been described in the first part of the present specification.

One of the constants $K_1$ or $K_2$ can be made to vary by any means whatever. For example, one of the armatures of the electro-magnet acted on by the two-phase voltages can recede more or less from the disc. For each position of this adjustable armature, a value of $K_1$ will correspond and hence a value of $\epsilon$ above which the relay can start operating. Another electro-magnet can be added to the above three mentioned electro-magnets through which flows a current proportional to the zero phase sequence component $U_r$ of the voltage in order to preserve the same operation for the relay in the event of voltage drop between two conductors and in case of voltage drop between conductor and earth.

In the second embodiment two electro-magnets are caused to act on the metallic disc of the motor equipment which electro-magnets are respectively subjected to the action of the direct and inverse components of the voltage system. The electro-magnet acted on by $U_i$ will exert its torque in the direction of release and the electro-magnet influenced by $U_d$ will exert its torque in the opposite direction. Under these conditions, matters may be arranged so that, if the voltages are balanced, the electro-magnet under the influence of $U_d$ will overcome the effect of the other and if the want of balance of the voltages exceeds a certain value, the electro-magnet acted on by $U_i$ will overcome the other and thus produce the relay release.

A third electro-magnet acted on by $U_r$ which exerts its torque in the direction producing relay release can be also added to these two electro-magnets.

In numerous cases, it may be of interest to obtain a selective relay for unbalanced voltages, the operation of which depends on the direction of power feeding the fault. The problem arises in particular in lines fed at their two extremities and in lines in parallel. In this case, the selective relay according to the invention can be designed in a manner differing slightly as follows.

The relay motor equipment is subjected to the action of an electro-magnet influenced by the negative phase sequence component $U_i$ of the voltage and by the negative phase sequence component $I_i$ of the current so as to obtain a torque of the form $$C = K\, U_i\, I_i\, \cos\,(\phi_i - \alpha),$$

$\phi_i$ being the phase angle of the negative phase sequence voltage components with respect to the negative phase sequence current compotent, and $\alpha$ denoting a constant depending on the motor electro-magnet and which may be chosen as a function of the mean value of the angle $\phi_i$ or of its probable value at the instant the fault occurs. The relay motor equipment is controlled by an opposing spring. The opposing equipment is constituted in one of the ways already indicated but it will be preferably subjected to a torque of the form: $(U_d^2 - U_i^2 - U_r^2)$. If the fault locality is such that the motor equipment torque is exerted in the opposite direction to that which must produce release, this equipment will remain against its stop and the relay will not operate. If the fault locality is such that the motor equipment torque is exerted in the direction which produces release, the motor equipment will start rotating and the relay will be released after an interval which depends both on the symmetrical voltage and current components and which can be expressed in the form:

$$t = K \frac{U_d^2 - U_i^2 - U_r^2}{U_i I_i \cos\,(\phi_i - \alpha)}.$$

Moreover, in certain cases the relay might only include part of the elements shown in the drawings or in the descriptions. Thus, in the three-phase lines with three conductors without earthed neutral, the parts of the relay utilized for protection against short circuits between conductor and earth may be omitted. Similarly, if the relay only serves for the protection of a circuit against the fault of earthing, the elements affording protection against contact between conductors may be omitted. The relay forming the object of the invention may serve for the protection of two-phase, or in general polyphase circuits. The circuit arrangement will be adapted for each case. Thus, in two-phase lines with three or four conductors, a two-phase circuit arrangement will be preferably employed, for example, that of Fig. 15, the electro-magnet $e_4$ being suppressed. In the case of a five-conductor two-phase line, the electro-magnet $e_4$ will be retained and it will be fed by the zero phase sequence voltage component of the circuit.

Fig. 18 shows a form of relay similar to that of Fig. 15 but differing therefrom by interesting details of construction. A metallic disc $d_1$ mounted between two bearings $p_1$ is subjected to the action of an electro-magnet $e_1$ and braked by a magnet $a$. The two bearings $p_1$ are secured to a frame $b$ which can pivot about pivots $p'_1$. This frame $b$ can have a rocking motion of small amplitude, limited by two stops not shown in the drawings. A spring $r$ brings the frame back against one of the stops. When the force developed by the electro-magnet $e_1$ is sufficient, the frame $b$ rocks and the tangent screw or worm $v$ engages with the toothed wheel or worm gear $s$, thus transmitting the rotational motion of the disc $d_1$ to the spindle $i$. A spiral spring $j$ is fastened at one end to a plug secured to the spindle $i$ and at the other end to a lever $l$ secured to the spindle $m$ of the second equipment which includes a metallic disc $d_2$ and a contact member $k_2$. The disc $d_2$ is pivoted between two bearings $p_2$ and is subjected to the action of two electro-magnets $e_2$ and $e_3$.

The electro-magnet $e_1$ produces on the disc $d_1$ a torque proportional to a suitable value, such as the negative phase sequence voltage component $U_1$, the negative phase sequence current component $I_1$, the negative phase sequence power component $U_r I_1 \cos \phi_1$, the reactive negative phase sequence component of the power $U_1 I_1 \sin \phi_1$, the complex negative phase sequence component of the power $U_1 I_1 \cos (\phi_1 - \alpha)$, where $\alpha$ is a constant, the zero phase sequence component of the power $U_r$, the earth current $I_o$, the power $U_r I_o \cos \phi_o$, etc. . . . The electro-magnets $e_2 e_3$ produce together on the disc $d_2$ a torque proportional to $U_d^2 - U_1^2 - U_r^2$ for example. The operation of the relay is similar to that of the apparatus already mentioned with the difference that the disc $d_1$ can start rotating before the factor acting on the electro-magnet $e_1$ has acquired the necessary value for producing engagement of the worm $v$ and the worm gear $s$. A contact $k_1$ which closes at the instant of engagement is provided to be connected in series with the principal contact $k_2$ in order to avoid the release of the circuit-breaker due to an accidental displacement of the disc $d_2$. The spring $r$ can be adjusted, so that engagement is brought about for a given value of the torque acting on the electro-magnet $e_1$. The magnet $a$ can also be adjusted, so as to adapt the timing of one group of relays with the line characteristics which they have to protect.

Other mechanical means are known enabling a relay member to be released after a lapse of time proportional to the quotient of two functions. It is known, for example, that the release retardation of any timed relay is proportional to the quotient of the travel it must accomplish before giving contact and its speed supposed uniform during its motion. It is therefore sufficient to provide a movable equipment the speed of which is proportional to the function in the denominator and to vary the travel of this equipment in proportion to the function in the numerator.

Fig. 19 shows an embodiment of such a relay in conformance with the invention. The relay release retardation is proportional to $$\frac{U_d^2 - U_i^2}{I_i^2}.$$

In Fig. 19, $T_1$ and $T_2$ are two voltage transformers comprising a Scott group. The secondary winding $S_1$ and $S_2$ of these transformers respectively feed the two windings $e_1$ and $e_2$ of an electro-magnet E. This electro-magnet acts on a disc $d$ braked by two magnets $a$ and controlled by a spring $r$.

The torque of the electro-magnet is exerted in the direction $f$ and is proportional to $U_d^2 - U_i^2$. The disc takes up a position of equilibrium for each value of the function $U_d^2 - U_i^2$. A pinion $p$ keyed on the spindle of the disc $d$ gears with a rack $c$ and transmits the motion of the disc to a rod $t$ which can move through two guides. A second disc $d'$ is subjected to the action of an electro-magnet $E'$, the two windings $e'_1$ and $e'_2$ of which are connected in parallel, a current proportional to the negative phase sequence component $I_1$ of the system of currents flowing through each of them.

The disc $d'$ is braked by two magnets $a'$ and is controlled by a spring $r'$. The disc $d'$ is cut out according to a law so that when it has started to rotate under the influence of an inverse current exceeding a given value, its motion continues in a uniform manner. This motion is transmitted through the agency of a pinion $p'$ and a rack $c'$ to a rod $t'$ which can move in two guides. Two contact members K and K' respectively borne by the rods $t$ and $t'$ cause by their encounter the operation of the circuit breaker which is controlled by the relay. The speed of the disc $d'$ is proportional to $I_1^2$ and the distance it must move through before contact is proportional to the angle of rotation of the disc $d$. It follows that the encounter of the contact members K and K' occurs with a retardation proportional to $$\frac{U_d^2 - U_i^2}{I_i^2}.$$

Another method of obtaining a retardation proportional to the quotient of two functions consists in making use of a movable constant speed equipment and in varying the travel that this equipment must make before causing a control contact, proportionally to the quotient of the two functions under consideration. Fig. 20 shows an embodiment of such a relay, the release retardation of which is proportional to $$\frac{U_d^2 - U_i^2}{U_d^2}.$$

A metallic disc $d$ is acted on by two electro-magnets $E_1$ and $E_2$ respectively under the influence of the positive and negative phase sequence components of the system of voltages. These electro-magnets act in opposite directions on the disc which is cut out to such a shape that it takes up a position of equilibrium depending only on the ratio $$\frac{U_i}{U_d}.$$

Calling $\alpha$ the angle of deviation of the disc it will, for example, be taken that $$\alpha = K \frac{U_i^2}{U_d^2}.$$

If $\alpha_o = K$ is the maximum deviation and if the angles are reckoned from this maximum deviation we have:

$$\beta = K - K\frac{U_i^2}{U_d^2} = K\left(\frac{U_d^2 - U_i^2}{U_d^2}\right).$$

A contact member $C_1$ is mounted on the spindle of the disc $d$ which may be retarded by drag magnets, not shown in the drawings. A second constant speed movable equipment comprises a spindle $a$ pivoted at its lower extremity in a foot-bearing C, which also serves as upper bearing for the spindle of the disc $d$. The spindle $a$ is guided at its upper end in a bearing P. This bearing is pivotally mounted in a stirrup $e$ secured to a magnetic armature A and acted on by a spring R. A constant speed motor M can engage by means of its tangent screw or worm $v$ with a toothed pinion or worm gear $p$ keyed on the spindle $a$. The engagement of the pinion $p$ is brought about by a slight displacement of the stirrup $e$ when the armature A is attracted by an electro-magnet $E_3$ having three coils $B_1$, $B_2$, $B_3$ respectively excited by three currents proportional to the line currents. A contact member $c_2$ is secured to the spindle $a$ and a spring $r$ opposes the motion transmitted by the screw $v$.

The operation of the relay is as follows. When the protected line is in normal condition, the line currents have only a moderate value and the armature A is not attracted by the electro-magnet $E_3$. The pinion $p$ is declutched from the motor M and the spring $r$ brings the upper equipment against a stop not shown. In case of fault on the line, the currents increase, the armature A is attracted and the pinion $p$ engages with the motor M which sets it in motion in the direction of the arrow with uniform speed. After a time proportional to the angle through which the disc $d$ has turned, the contact $C_2$ meets the contact $C_1$ thus bringing about the operation of the circuit breaker.

I claim:

1. Polyphase circuit protecting and timing apparatus including two relatively movable equipments, means enabling one equipment to act on the other and means for causing torques dependent on different predetermined functions of the phase sequence components of the circuit to be protected to act on said equipments.

2. Polyphase circuit protecting and timing apparatus including two relatively movable equipments, means enabling one equipment to act on the other and means for causing torques dependent on different predetermined functions of the phase sequence components of the circuit to be protected to act on said equipments, said torques acting in opposition on said equipments.

3. Protecting and timing apparatus for a polyphase circuit including two relatively movable equipments, means enabling one equipment to exert a driving force on the other, means for causing torques dependent on different predetermined functions of the phase sequence components of the circuit to be protected to act in opposition on said equipments respectively and means on said other equipment for controlling said circuit.

4. Polyphase circuit protecting and timing apparatus including two relatively movable equipments, yielding means enabling one equipment to exert a driving force on the other, means for causing torques dependent on different predetermined functions of the phase sequence components of the circuit to be protected to act in opposition on said equipments respectively.

5. Protecting apparatus for a polyphase circuit including two relatively movable equipments, resilient means for enabling one equipment to exert a driving torque on the other, means for causing torques dependent on different predetermined functions of the phase sequence components of the circuit to be protected to act on said equipments, said torques acting in opposition on said equipments and means on said other equipment for controlling said circuit.

6. Protecting and timing apparatus for a polyphase circuit including two relatively movable equipments, means enabling one equipment to exert a driving torque on the other, means for causing torques dependent on different predetermined functions of the phase sequence components of the circuit to be protected to act in opposition on said equipments respectively, means on said other equipment for controlling said circuit and devices for effecting the energization of one of said equipments only when a fault occurs on the circuit.

7. Protecting and timing apparatus for a polyphase circuit including two relatively movable equipments, means enabling one equipment to exert a driving torque on the other, means for causing torques dependent on different predetermined functions of the phase sequence components of an electric quantity of the circuit to be protected to act in opposition on said equipments respectively, means in said other equipment for controlling said circuit and devices for causing said driving equipment to move only when a fault occurs on the circuit.

8. Protecting and timing apparatus for a polyphase circuit including two relatively movable equipments, means enabling one equipment to exert a driving torque on the other, means for causing torques dependent on different predetermined functions of the phase sequence components of the circuit to be protected to act in opposition on said equipments respectively, controlling means in said other equipment for effecting the opening of said circuit, and devices for causing said driving equipment to move in a direction to exert a torque on said other equipment only when a fault occurs on the circuit, said devices being arranged to move the driving member in the opposite direction to its original position when the fault ceases.

9. Protecting and timing apparatus for a polyphase circuit including two relatively movable equipments, resilient means enabling one equipment to exert a driving torque on the other, means for causing torques dependent on different predetermined functions of the phase sequence components of an electric quantity of the circuits to be protected to act in opposition on said equipments respectively, said one equipment being retarded and arranged to drive said other equipment when the torque acting on said one equipment overcomes the torque acting in opposition on said other equipment, controlling means on said other equipment for effecting the opening of said circuit, said controlling means becoming operative when said other equipment is displaced.

10. Protecting and timing apparatus for a polyphase circuit including two relatively movable equipments, yielding means enabling one equipment to exert a driving torque on the other, circuit arrangements for obtaining phase sequence components of the circuit to be protected, means for causing torque dependent on different predetermined functions of said components to act in opposition on said equipments and controlling means on said other equipment for effecting the opening of said circuit when said other equipment is displaced.

11. Polyphase circuit protecting apparatus, including a motor equipment and an opposing equipment, means for causing a torque functional of at least one of the phase sequence voltage components of the circuit to be protected to act on said motor equipment, and means for causing a torque functional of the square of a positive phase sequence voltage component, of the square of a negative phase sequence voltage component and of the square of a zero phase sequence voltage component to act on said opposing equipment.

12. Polyphase circuit protecting and timing apparatus, including a retarded motor equipment and an opposing equipment, means for causing a torque functional of at least one of the phase sequence components of the circuit to be protected to act on said motor equipment, and means for causing a torque functional of the square of a positive phase sequence voltage component, of the square of a negative phase sequence voltage component and of the square of a zero phase sequence voltage component to act on said opposing equipment, said torques acting in opposition to each other.

13. Polyphase circuit protecting and timing apparatus, including a motor equipment and an opposing equipment, means for causing a torque functional of at least one of the phase sequence voltage components of the circuit to be protected to act on said motor equipment, and means for causing a torque functional of the square of a positive phase sequence voltage component, of the square of a negative phase sequence voltage component and of the square of a zero phase sequence voltage component to act on said opposing equipment, and a mechanical connection between said two equipments.

14. Polyphase circuit protecting and timing apparatus, including a motor equipment and an opposing equipment, means for causing a torque functional of at least one of the phase sequence voltage components of the circuit to be protected to act on said motor equipment, and means for causing a torque functional of the square of a positive phase sequence voltage component, of the square of a negative phase sequence voltage component and of the square of a zero phase sequence voltage component to act on said opposing equipment, and a mechanical flexible connection between said two equipments.

15. Polyphase circuit protecting and timing apparatus, including a retarded motor equipment and an opposing equipment, means for causing a torque functional of at least one of the phase sequence voltage components of the circuit to be protected to act on said motor equipment, and means for causing a torque functional of the squares of at least two of the phase sequence voltage components of the circuit to act on said opposing equipment said torques acting in opposition to each other, and a mechanical connection between said two equipments.

16. Polyphase circuit protecting and timing apparatus, including a motor equipment and an opposing equipment, means for causing a torque functional of at least one of the phase sequence voltage components of the circuit to be protected to act on said motor equipment, and means for causing a torque functional of the squares of at least two of the phase sequence voltage components of the circuit to act on said opposing equipment said torques acting in opposition to each other, and a mechanical flexible connection between said two equipments.

17. Polyphase circuit protecting and timing apparatus including a motor equipment and an opposing equipment, means for causing a torque functional of at least one of the phase sequence voltage components of the circuit to be protected to act on said motor equipment, and means for causing a torque proportional to the difference between the square of a positive phase sequence voltage component and the sum of the squares of the negative and the zero phase sequence voltage components to act on said opposing equipment.

18. In combination with a three-phase circuit and a switch therefor, protecting and timing apparatus including a rotatable disc mounted on a spindle, electro-magnetic means for exerting on said rotatable disc a torque dependent on at least one of the phase sequence voltage components of the circuit, means for retarding said disc, a stop preventing rotation of said disc in one direction, means for reversing the direction of torque on said disc when a fault occurs in the circuit, a second rotatable disc mounted on a spindle coaxial with the spindle of said first mentioned disc, a spring member connecting said coaxial spindles, electro-magnetic means for exerting on said second mentioned disc a torque opposed to the torque on said first mentioned disc and proportional to the difference between the square of a positive phase sequence voltage component of the circuit and the sum of the squares of the positive and the negative phase sequence voltage components of the circuit, a contact member mounted on said second mentioned spindle, said contact member effecting the opening of said switch when the torque exerted by said spring on said second mentioned disc overcomes the opposing torque exerted on said second mentioned disc, and stops to limit the rotation of said second mentioned disc.

19. Three-phase circuit protecting and timing apparatus, including in combination a rotatable disc mounted on a spindle on said disc, a torque proportional to the sum of the squares of the positive and negative phase sequence voltage components of the circuit to be protected, means for retarding the speed of said disc, a shaft coaxial with said spindle, electro-magnetic means for exerting on said shaft a torque opposing the torque on said disc and being proportional to the difference between the square of a positive phase sequence voltage component of the circuit to be protected and the sum of the squares of the negative and zero phase sequence voltage components, resilient connecting means between said spindle and said shaft, a contact member on said shaft and means for limiting the rotation of said shaft.

20. Polyphase circuit protecting apparatus including in combination two movable equipments, relatively movable contacts controlled by said equipments, means for subjecting said equipments to torques functional of phase sequence components of the circuit to be protected, means for causing one equipment to rotate at substantially constant speed when a fault occurs in said system and means for causing said other equipment to take a position of equilibrium, said position of equilibrium, regulating the distance through which one of said contact members must move before contact takes place.

21. Polyphase circuit protecting apparatus including in combination a rotatable disk mounted on a spindle, electromagnetic means for exerting on said disk a torque dependent on a predetermined function of a plurality of the phase sequence components of an electric quantity of the circuit to be protected, means for retarding said disk, means tending to bring said disk back to an initial position, a movable member, a resilient connection between said spindle and said movable member, a contact associated with said member, electromagnetic means for exerting on said member a torque proportional to a predetermined function of the phase sequence voltage components of the circuit, said electromagnetic means acting on said member in opposition to the driving action of said disk.

22. In combination, means for exerting an effect dependent on a predetermined function of a plurality of the phase sequence components of an electric quantity of a circuit, cooperating means for exerting an effect dependent on at least one of the phase sequence components of an electric quantity of the circuit and means controlled by the conjoint action of said exerting means.

23. In combination, means for exerting an effect dependent on a function of at least two of the phase sequence components of an electric quantity of a circuit, cooperating means for exerting an effect dependent on a function of at least one of the phase sequence components of an electric quantity of the circuit and means controlled by the conjoint action of said exerting means in accordance with a resultant of the effects exerted thereby.

24. In combination, means for exerting a force dependent on a predetermined function of at least two of the phase sequence components of an electric quantity of a circuit and cooperating means for exerting a force dependent on a different predetermined function of said two phase sequence components of said electric quantity and means controlled conjointly by said force exerting means in accordance with one of the phase sequence components of said electric quantity.

25. An electro-responsive device including rotatably mounted induction disc means and electro-magnetic means for exerting thereon a torque dependent on the difference between two different predetermined functions of the phase sequence components of an electric quantity of a circuit.

26. In combination, two relatively movable members, means for exerting on one of said members a force dependent on the sum of the squares of the positive and negative phase sequence components of an electric quantity of a polyphase circuit and means for exerting on the other member a force dependent on the difference between the squares of said phase sequence components, and means controlled by the conjoint action of said movable members.

27. In combination, a retarded movable member, means for exerting thereon a force dependent on the sum of the squares of the positive and negative phase sequence components of an electric quantity of a polyphase circuit, a relatively movable member, means for exerting thereon a force dependent on the difference between the squares of said phase sequence components and means controlled by the relative movement of said movable members.

28. The combination of relatively movable members and means for controlling the relative movement thereof including means for exerting a force dependent on a predetermined function of a plurality of the phase sequence components of an electric quantity of a circuit and cooperating means for exerting a force dependent on at least one of the phase sequence components of an electric quantity of the circuit.

29. The combination of relatively movable members and means for controlling the relative movement thereof including means for exerting a force dependent on a predetermined function of a plurality of phase sequence components of an electric quantity of a circuit and cooperating time element means for exerting a torque dependent on a different predetermined function of a plurality of the phase sequence components of an electric quantity of the circuit.

30. In combination, relatively movable members, means for controlling the relative movement thereof in accordance with the difference between the sum of and the difference between the squares of the positive and negative phase sequence components of an electric quantity of a polyphase circuit.

31. In combination, a movable member and means for exerting thereon a force dependent on a predetermined function of the phase sequence components of an electric quantity of a polyphase circuit, and means for varying the effect of one of said phase sequence components on said member including a device arranged to exert a force dependent on a different predetermined function of the phase sequence components of said circuit.

32. Protective apparatus for a polyphase electric circuit including two relatively movable members, means for retarding the movement of one of said members, means for controlling the relative movement of the members including means for exerting on the retarded member a force dependent on a predetermined function of the phase sequence components of an electric quantity of the circuit to be protected, means for exerting a force on said other member, and means responsive to an abnormal condition of the circuit for changing the direction of the force exerted on one of said members.

33. Protective apparatus for a polyphase electric circuit including two relatively movable members and means for controlling the relative movement thereof including means for exerting on one of said members a force dependent on a predetermined function of the phase sequence components of an electric quantity of the circuit to be protected, means for changing the effect of one of said phase sequence components on said one of said members including means for exerting on the other member a force dependent on a different predetermined function of the phase sequence components of an electric quantity of the circuit, and means for controlling the starting and for insuring a rapid reset of the second movable member.

EMILE GRASSOT.

Certificate of Correction

Patent No. 1,816,675.  Granted July 28, 1931, to

EMILE GRASSOT.

It is hereby certified that error appears in the printed specification of the above-numbered patent requiring correction as follows: Page 1, line 60, strike out "$U_d{}^m - U_i{}^m - k_r{}^m,$" and insert instead $U_d{}^m - U_i{}^m - kU_r{}^m;$ page 2, line 43, for "vanish" read *vanishes;* page 3, line 82, strike out "where $\beta = A\ _B\ C$ of $\triangle A B C$" and insert instead *where $\beta = A\ \hat{B}\ C$ of $\triangle A B C$;* same page line 87, strike out "where $\gamma = B\ _C\ A$ of $\triangle A B C$" and insert instead *where $\gamma = B\ \hat{C}\ A$ of $\triangle A B C$;* line 99, strike out "$\beta + U_2 U_3 \cos \gamma) = U^2{}_1 + U_2{}^2 + {}^2{}_3$" and insert instead $\beta + U_2 U_3 \cos \gamma) = U^2{}_1 + U_2{}^2 + U^2{}_3;$ page 9, lines 56 and 57, for the misspelled word "oomppotent" read *components;* page 10, line 57, for "winding" read *windings;* and that the said Letters Patent should be read with these corrections therein that the same may conform to the record of the case in the Patent Office.

Signed and sealed this 1st day of September, A. D. 1931.

[SEAL.]

M. J. MOORE,
*Acting Commissioner of Patents.*